United States Patent [19]
Tseng

[11] Patent Number: 5,485,937
[45] Date of Patent: Jan. 23, 1996

[54] SANITARY CHOPPING PLATE STRUCTURE

[76] Inventor: Cheng-Tzu Tseng, No. 172, Wu-Chi Road, Wu-Chi Town, Taichung Hsien, Taiwan

[21] Appl. No.: 284,854

[22] Filed: Aug. 2, 1994

[51] Int. Cl.⁶ .................................................. B65D 43/00
[52] U.S. Cl. .......................... 220/571; 220/574; 220/405; 220/636; 220/413
[58] Field of Search ..................................... 220/571, 405, 220/574, 575, 636, 638, 410, 413

[56] References Cited

U.S. PATENT DOCUMENTS

| | | | |
|---|---|---|---|
| 1,583,512 | 5/1926 | Worth | 220/405 |
| 1,627,051 | 5/1927 | Moore | 220/574 |
| 2,053,949 | 9/1936 | Emery | 220/574 |
| 2,094,257 | 9/1937 | Luck et al. | 220/405 |
| 2,170,040 | 8/1939 | Stuart | 220/574 |
| 3,698,594 | 10/1972 | Boehlert | 220/405 |
| 3,989,158 | 11/1976 | Florian | 220/574 |
| 4,722,442 | 2/1988 | Smith | 220/571.1 |
| 4,800,845 | 1/1989 | Budd | 220/405 |
| 5,423,451 | 6/1995 | Snyder | 220/574 |

*Primary Examiner*—Joseph M. Moy
*Attorney, Agent, or Firm*—Pro-Techtor International

[57] ABSTRACT

The chopping plate structure has a bottom disk and at least one chopping plate, wherein several feet are provided around the lower edge of the disk, an inclining surface is formed between each foot and the top edge of and a plain plane is formed by the top surface of the disk, and a groove is provided around the periphery of the plane; Further, the chopping plates each is formed of a thin slice declined from its center area toward its periphery then raised again to its end edge to form another inclining surface, a water collecting groove is formed at the periphery of the slice and corresponding to the groove of the disk, the groove and the water collecting groove are matched with each other, different slices are interchangeable in a simple and quick mode to be matchably and firmly put on the disk.

8 Claims, 2 Drawing Sheets

SANITARY CHOPPING PLATE STRUCTURE

BACKGROUND OF THE INVENTION

1. Field of the Invention

The present invention relates to a sanitary choping plate structure, and especially to one having a bottom disk available for a plurality of chopping plates, various kinds of food can be treated on their respective plate for maintening sanitation, this structure can also prevent water and the food being chopped from dropping out of their chopping plate.

2. Description of the Prior Art

A conventional chopping board or plate has the following disadvantage:

1) The conventional chopping board or plate is made of woody of plastic material, it is heavy and bulky, occupies quite a space, so that a normal family uses only one or two chopping plate, however, food being treated always has various kinds, raw and cooked food, meat and vegetable food, food for human and for animal, they can not be treated on the same plate, hence one or two plates only can not afford the practical requirement and are unsanitary, yet not only inconvenience exists in food treatment, but health of human body also is adversely influenced.

2) The conventional chopping board or plate is in a plain board or plate shape, in case the food being treated is too much or has too much water therein, the food will always drop out of the plate and become dirty, or the water will flow over to render the kitchen cabinet to be wet and unclean, the user therefore will feel inconvenience.

SUMMARY OF THE INVENTION

In view of the above statement, the inventor of the present invention designed and developed after a lot of tests the sanitary choping plate structure of present invention.

The main object of the present invention is to use a bottom disk available for a plurality of chopping plates, various kinds of food can be treated on their respective plate for maintening sanitation, this structure can also prevent water and the food being chopped from dropping out of their chopping plate to render the kitchen cabinet to be wet and unclean. Besides, the chopping plate of the present invention has a character of being thin and cheap, so that a user can discard it and take a new plate if it is damaged by a knife and is full of carving scars to be subjected to bacteria's breeding, sanitation can thus be maintained.

The present invention will be apparent in its realistic structure, characteristics and functions thereof after reading the detailed description of the preferred embodiment thereof in reference to the accompanying drawings.

DETAILED DESCRIPTION OF THE PREFERRED EMBODIMENT

Figure 1:
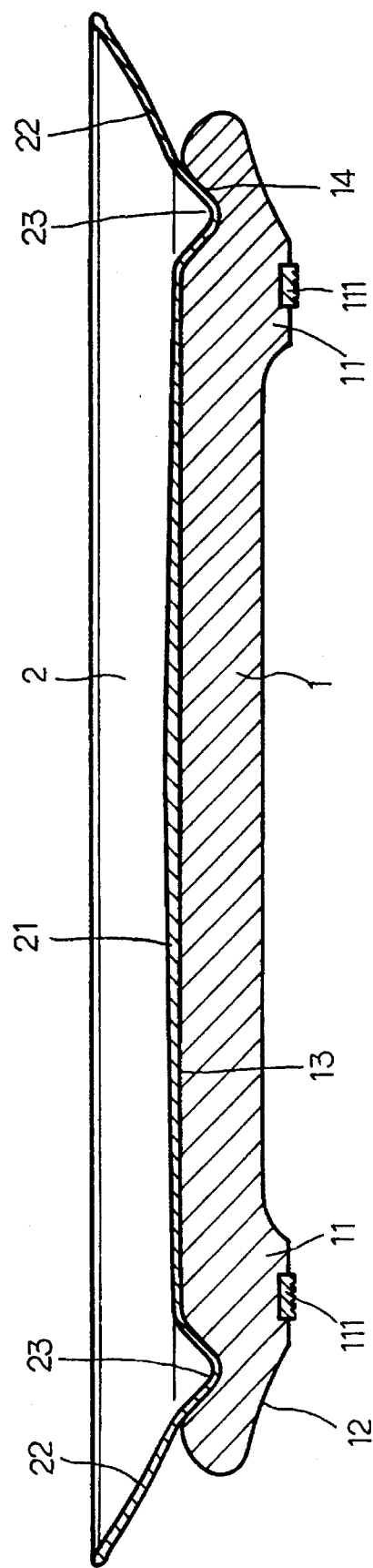
FIG. 1 is a lateral sectional view of the present invention.
Figure 2:
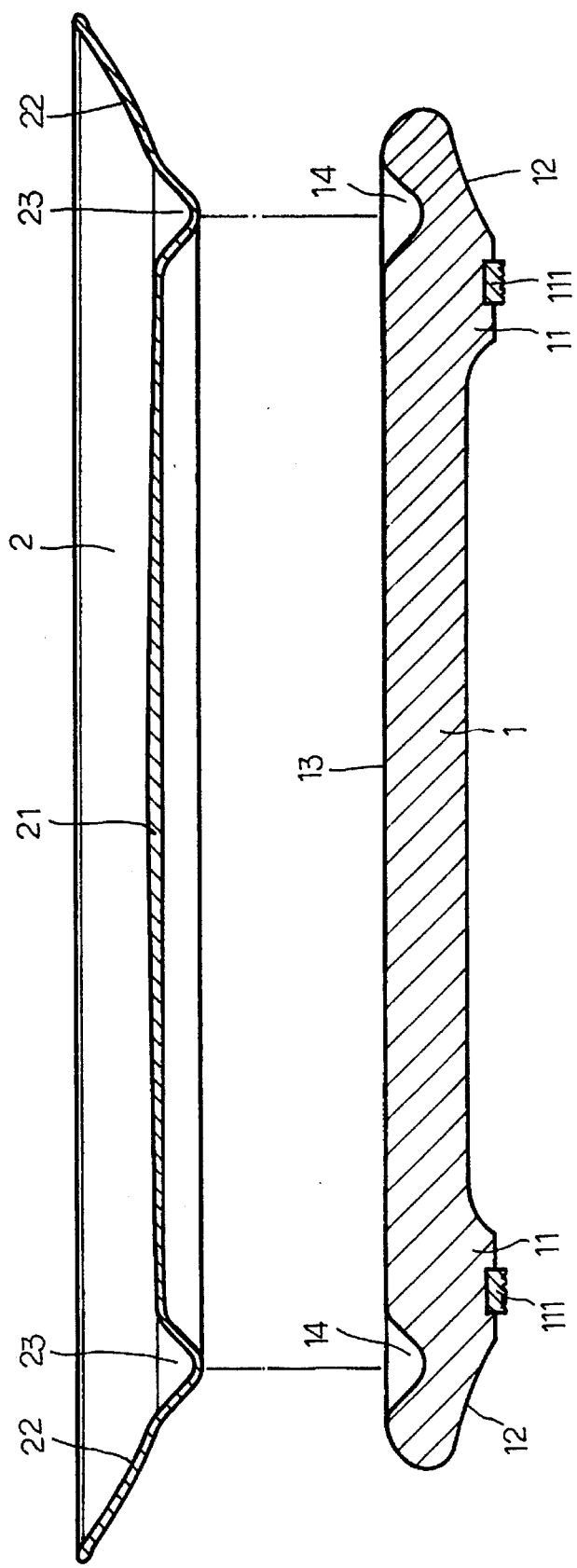
FIG. 2 is a lateral analytical sectional view of the present invention.

Referring to FIG. 1 and 2, the present invention is comprised of a bottom disk 1 and at least one chopping plate 2, wherein a plurality of feet 11 are provided around the lower edge of the bottom disk 1, an inclining surface 12 is formed between each foot 11 and the top edge of the bottom disk 1, a plain plane 13 is formed by the top surface of the bottom disk 1, and a groove 14 is provided around the periphery of the plain plane 13.

Further, the chopping plates 2 of the present invention each is formed of a thin slice 21 which is declined from its center area toward its periphery and then raised again to its end edge to form an inclining surface 22, a water collecting groove 23 thus is formed at the periphery of the slice 21 and is corresponding to the groove 14 of the bottom disk 1.

By the structure stated above, a plurality of chopping plates 2 of the present invention can be used with the bottom disk 1 thereof alternatively, so that raw and cooked food, meat and vegetable food, and food for human and for animal can be treated using their respective chopping plate 2, sanitation in food treatment can thus be maintained.

Moreover, in using of a chopping plate 2 of the present invention, the water in watery food being chopped will flow into the water collecting groove 23 due to the declined periphery of the slice 21, thus being wetted or becoming dirty of the kitchen cabinet can be prevented.

The inclining surface 22 of each chopping plate 2 makes the chopping plate 2 have a disk shape like a dish, whereby a lot of food can be piled thereon without dropping out of the chopping plates 2 to become dirty, hence the chopping plates 2 of the present invention can be used further as vessels, after chopping, each chopping plate 2 and the food can be brought as a whole to where a pot is disposed, the food can be conveniently moved into the pot without worry of dropping of the food.

Besides, a slip-proof gasket 111 of rubber material is provided under each foot 11 of the bottom disk 1, this can prevent the bottom disk 1 from slipping when the user chops or cuts the food, and also prevent the kitchen cabinet or other planes from being damaged by protection of the slip-proof gasket 111.

The inclining surface 12 provided between each foot 11 and the top edge of the bottom disk 1 is for the purpose of keeping a space between the periphery of the bottom disk 1 and the kitchen cabinet, so that fingers of the user can be easy of access to the space for lifting the whole chopping plate structure.

The sanitary chopping plate structure of the present invention can have round, square or rectangular or other suitable shape.

Accordingly, the sanitary chopping plate structure of the present invention has the advantage of treating various food with a plurality of chopping plates to keep sanitation, and of preventing food being chopped from dropping out of the chopping plates to render the kitchen cabinet and the food to be unclean, this is really novel and improved as to the conventional structure of chopping board.

My invention may assume numerous forms and is to be construed as including all modifications and variations falling within the scope of the appended claims.

I claim:

1. A sanitary chopping plate structure, comprising a bottom disk and at least one chopping plate, wherein a plurality of feet being provided around the lower edge of said bottom disk, an inclining surface being formed between each said foot and the top edge of said bottom disk, a plain plane being formed by the top surface of said bottom disk, and a groove being provided around the periphery of said plain plane; further, said chopping plates each being formed of a thin slice which is declined from its center area toward its periphery and then raised again to its end edge to form another inclining surface, a water collecting groove thus being formed at the periphery of said slice and being corresponding to said groove of said bottom disk, said groove and said water collecting groove of each slice being matched and being put together, different slices being interchangeable in a simple and quick mode to be matchably and firmly put on said bottom disk.

2. A sanitary chopping plate structure as stated in claim 1, it is characterized in that due to said slice being raised toward its end edge, water contained in food will not spill over said end edge, and hands of a user can take advantage thereof to lift said slice.

3. A sanitary chopping plate structure as stated in claim 1, it is characterized in that due to said inclining surface formed between each said foot and the top edge of said bottom disk, hands of a user can take advantage thereof to lift said bottom disk.

4. A sanitary chopping plate structure as stated in claim 1, wherein a slip-proof gasket is provided under each foot of said bottom disk.

5. A sanitary chopping plate structure as stated in claim 3, wherein a slip-proof gasket is provided under each foot of said bottom disk.

6. A sanitary chopping plate structure as stated in claim 1, wherein said plate structure includes round, square or rectangular or other suitable shape.

7. A sanitary chopping plate structure as stated in claim 2, wherein said plate structure includes round, square or rectangular or other suitable shape.

8. A sanitary chopping plate structure as stated in claim 3, wherein said plate structure includes round, square or rectangular or other suitable shape.

\* \* \* \* \*